A. L. KIRKWOOD.
COMBINATION MEASURING AND TRANSFER TANK PUMP.
APPLICATION FILED MAR. 8, 1918.
1,297,865.
Patented Mar. 18, 1919.
3 SHEETS—SHEET 3.
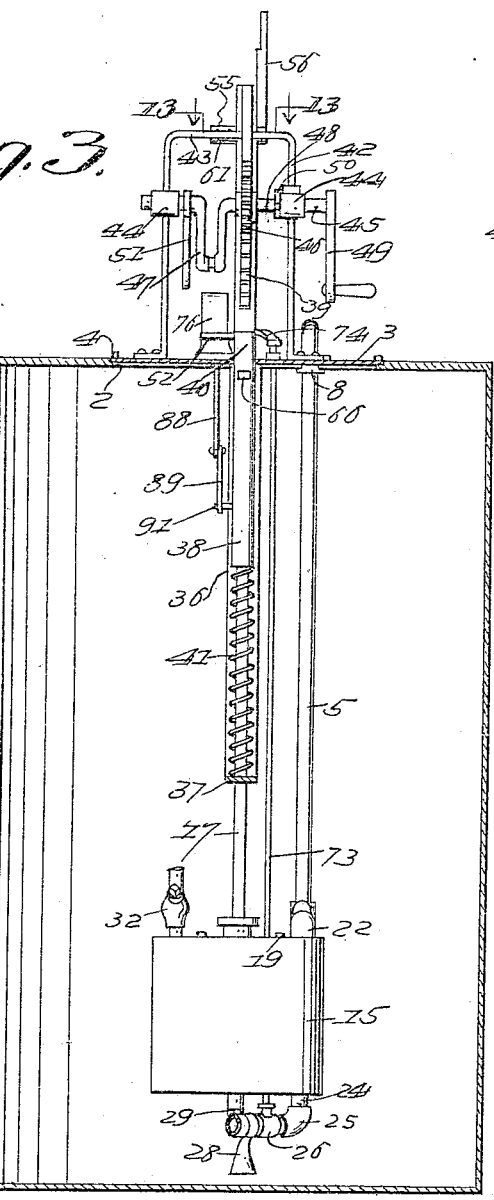
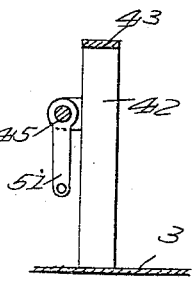
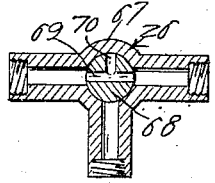
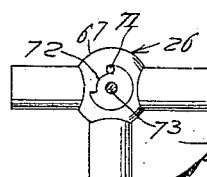
Inventor
A. L. Kirkwood,
By E. Hume Talbot
Attorney

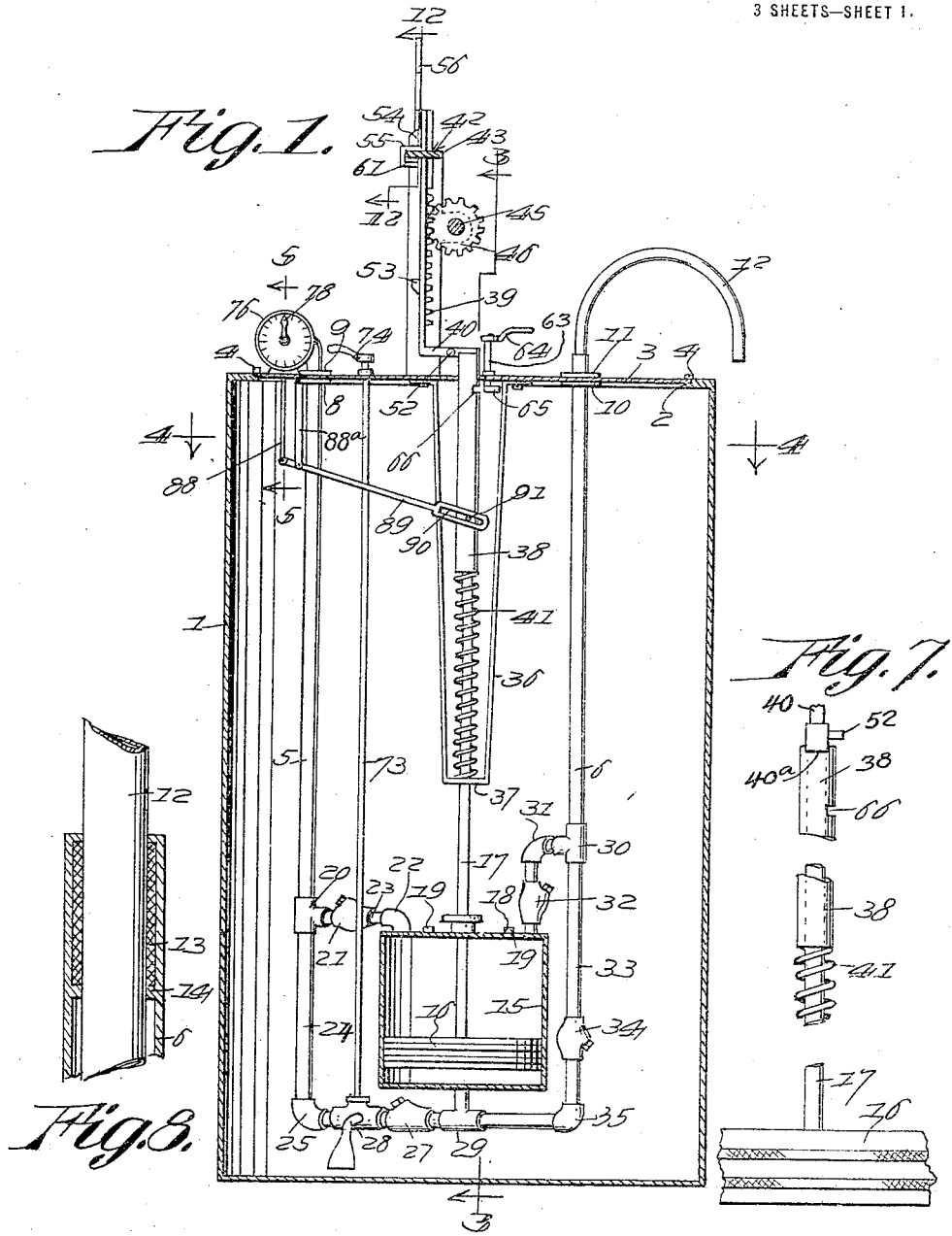

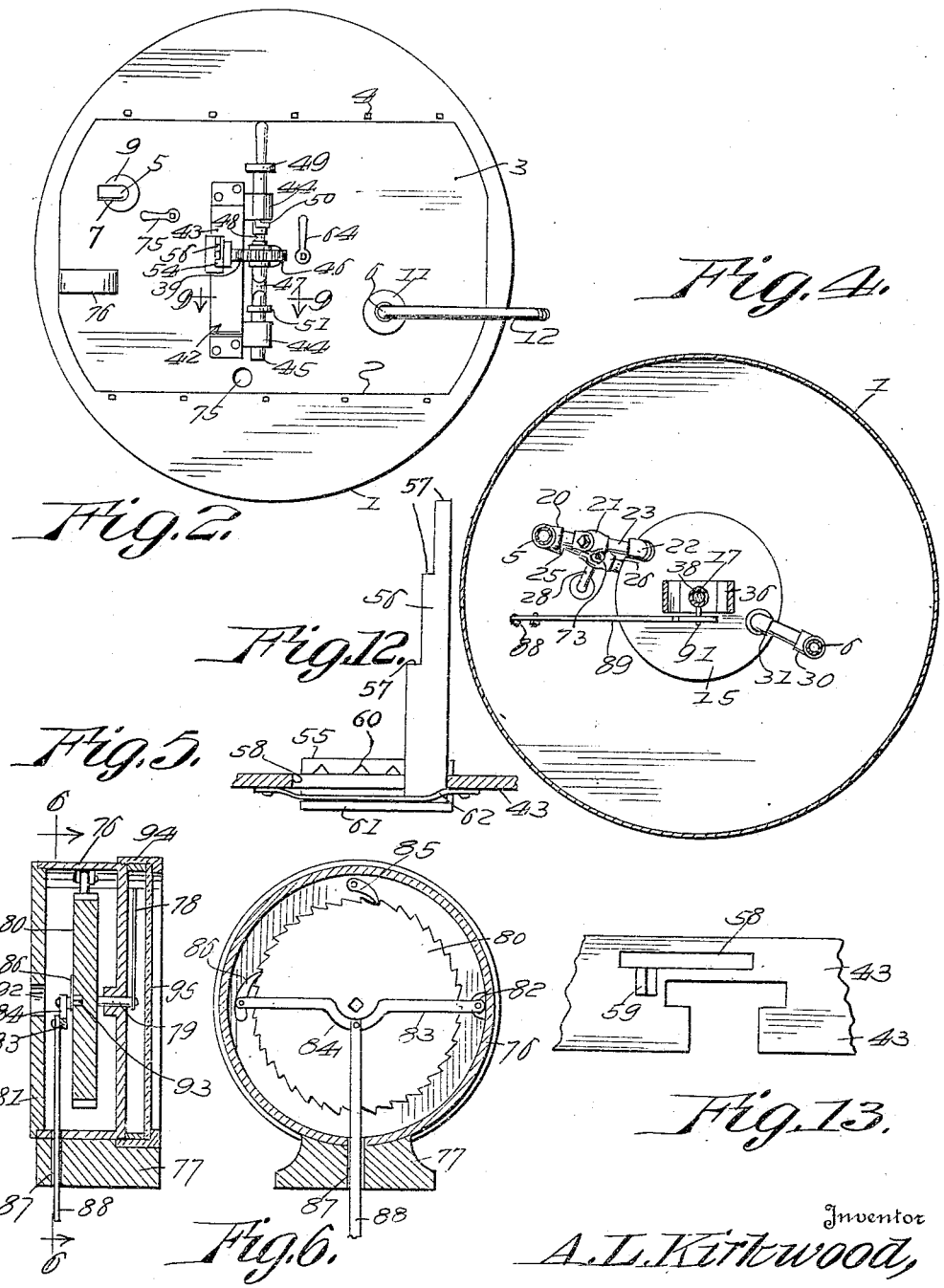

UNITED STATES PATENT OFFICE.

ABRAHAM L. KIRKWOOD, OF BLOCKER, TEXAS.

COMBINATION MEASURING AND TRANSFER TANK-PUMP.

1,297,865. Specification of Letters Patent. Patented Mar. 18, 1919.

Application filed March 8, 1918. Serial No. 221,180.

*To all whom it may concern:*

Be it known that I, ABRAHAM L. KIRKWOOD, a citizen of the United States of America, residing at Blocker, in the county of Harrison and State of Texas, have invented new and useful Improvements in Combination Measuring and Transfer Tank-Pumps, of which the following is a specification.

The invention has general reference to devices for handling oil but it is particularly a device for use in transferring oil from one container to another, measuring the quantity of oil involved during the transferring operation.

It consists essentially of a tank in which there is positioned near the bottom a pump capable of being used either as a single acting or double acting pump. When operating as a double acting pump, the latter is designed to take oil from one container and transfer it to another container without having the oil enter the tank in which the pump is contained. When operating as a single acting pump, its function is to remove oil from the tank in which it, the pump, is carried, predetermined quantities of oil being drawn into the pump on each stroke thereof.

The tank in which the pump is contained is provided for the purpose of receiving a quantity of oil to be measured or to be drawn therefrom in predetermined quantities and the pump is capable of taking the oil from some exterior source of supply and delivering this oil into the same tank with itself. A register is connected with the piston of the pump and is arranged to register each stroke thereof. The length of stroke may be varied by means of mechanical devices connected with the tank and the register is adapted to record the strokes in single units, in double or in triple units, depending of course upon the relative lengths of the strokes.

The pump is intended to be operated as a single acting pump only when it is discharging oil contained in the same tank with it. When the pump is engaged in the transferring operation it is, as before stated, converted into a double acting pump, the particular devices making this conversion possible being adapted for quick connection or disconnection from the piston of the pump.

Other and further features of the invention are made apparent as the detail description of the same progresses.

To the exact construction in which it is shown and described, the invention is not to be restricted. Its continued practical use may make manifest certain desirable changes or alterations and the right is claimed to make any which do not depart from the spirit of the subjoined claims.

The same numerals of reference designate the same parts throughout the several figures of the drawings, wherein:

Figure 1 is a vertical sectional view of the invention.

Fig. 2 is a top plan view.

Fig. 3 is a longitudinal sectional view taken on the line 3—3 of Fig. 1.

Fig. 4 is a transverse sectional view taken on the line 4—4 of Fig. 1.

Fig. 5 is a section on the line 5—5 of Fig. 1.

Fig. 6 is a section on the line 6—6 of Fig. 5.

Fig. 7 is an enlarged broken view of the piston and its attendant sleeve member.

Fig. 8 is an enlarged longitudinal sectional view showing the telescopic connection between the discharge pipe and its goose-neck.

Fig. 9 is a section on the line—9—9 of Fig. 2.

Fig. 10 is a horizontal sectional view of the three-way valve used to render the pump single-acting or double-acting.

Fig. 11 is a plan view of the said valve.

Fig. 12 is a section on the line 12—12 of Fig. 1.

Fig. 13 is a section on the line 13—13 of Fig. 3.

Referring to the drawings, there is shown a cylindrical tank 1 closed at its bottom end and partially closed at its top end with the exception of having a rectangular opening 2 formed in this top end. For this rectangular opening 2, a plate 3 is designed the plate being secured to the upper end of the tank 1 by appropriate cap screws 4 positioned at uniformly spaced intervals around the perimeter of the plate and near the edges thereof.

The pump which is contained within the tank 1 is supported by the plate 3 and projects down into the former, there being pipes 5 and 6 which are connected to the plate and also to the pump and serve to support the latter. The pipe 5 projects through the plate, being threaded at the point where it enters the latter and receiving a flange 8 which abuts the bottom face of the plate and receiving also a flange 9 which is screwed onto the pipe after it is passed through the plate, this flange 9 abutting the plate on the top. The pipe 5 terminates above the plate in an elbow 7. In a similar way, the pipe 6 is secured to the plate, having its upper end threaded and receiving flanges 10 and 11, which abut the plate 3 on its top and bottom faces, thus securing the pipe rigidly to the plate. The pipe 6 is of relatively large diameter where it passes through the plate 3, so that the goose-neck 12 may be telescoped therein, this goose-neck contacting with packing 13 contained within the upper end of the pipe 6 and standing between its inner wall and the outer wall or telescoping leg of the goose-neck, the packing 13 being secure against longitudinal movement in the pipe by means of annular flanges 14 one of which is formed at the upper end of the pipe and the other at a point a specified distance below the upper end. The goose-neck 12 is adapted for longitudinal movement in the pipe 6 and also for angular movement therein, the packing 13 being designed to prevent leakage at the points where the two connect.

The pump cylinder 15 is positioned as close to the bottom of the tank 1 as practical and carries on its interior a piston 16 with which a piston rod 17 is connected, the latter passing slidably through the center of the cylinder head 18 which is attached to the cylinders by appropriate cap screws 19.

The pipe 5 terminates at a point just above a line passing horizontally across the upper face of the cylinder head 18 and has attached to it a T 20, the leg of which connects with one end of the check valve 21. An elbow 22 threads into the cylinder head 18 and connects with the other end of the check valve 21 by means of the nipple 23. A pipe 24 serves as a continuation of the pipe 5 by attachment to the opposite end of the cross leg of the T 20, this pipe receiving at its lower end an elbow 25 with which a three-way valve 26 connects. The second leg of the three-way valve connects with the check valve 27 while the third leg connects with the elbow 28, the free leg of the latter extending downwardly and being formed in the shape of a cone so that it has a relatively large opening at its lower end. By means of an appropriate nipple, the check valve 27 connects with the T 29, the leg of the latter threading into the bottom end of the cylinder 15.

The pipe 6 communicates with the upper and lower ends of the cylinder 15 in very much the same way that the pipe 5 communicates with the latter, there being a T 30, an elbow 31, and a check valve 32 with appropriate nipples by means of which connection is had with the upper end of the cylinder through the cylinder head 18 and there being also a pipe 33, a check valve 34 and an elbow 35 with appropriate nipples by means of which engagement is effected with the T 29.

A stirrup 36 is appropriately attached to the under face of the plate 3, so that a center line through the cylinder will pass midway between its legs, this stirrup extending down into the tank and terminating at a point a specified distance above the top of the cylinder 15, there being an appropriate hole formed in the transverse portion 37 of the stirrup through which the piston rod 17 slidably passes, the latter also passing through an appropriate hole formed in the plate 3. A sleeve 38 loosely surrounds the piston rod 17 and is adapted for sliding engagement in the hole through which the piston rod passes. The piston rod 17 is for the main part circular in cross section, but at a specified point above the upper face of the plate 3 it is offset and made T-shaped in cross section, having on one edge of this T-shaped portion a series of rack teeth 39. The portion 40, which connects the T-shaped or offset portion with the piston rod and differs from the piston rod and from the T-shaped portion in that it is rectangular in cross section, forms a shoulder where it adjoins the piston rod and this shoulder enters a slot $40^a$ formed in the upper end of the sleeve 38, thus precluding angular movement of the latter on the piston rod. The sleeve is held normally against the shoulder provided by the portion 40 by means of a spiral spring 41 which surrounds the piston rod 17 and is compressed between the upper face of the transverse portion 37 of the stirrup and the bottom end of the sleeve member 38. This spring 41 tends normally to keep the piston rod and the piston raised to their highest points which, for the piston, is at the upper end of the cylinder adjacent the cylinder head 18. On top of the plate 3 and positioned transversely on the latter there is a U-shaped member 42 which is secured to the plate in any appropriate manner, the transverse portion 43 of this member having an appropriate T-slot formed in one edge in which the T-shaped rack portion of the piston rod slidably engages, the teeth 39 of the latter projecting beyond the said edge of this portion. At appropriate points below the transverse portion 43, each leg of the U-shaped member 42 has lateral projections 44 formed on its edges on the same side of the U-shaped member in which the T slot is formed. In each of these lateral projections 44 an appropriate bearing is formed for the shaft 45, this shaft 45 having attached to it a pinion 46 which meshes with the teeth 39 of the rack portion of the piston rod.

Between the pinion 46 and one of the lateral projections 44 a crank 47 is formed in the shaft while at a certain point on the shaft a circumferential slot 48 is formed, the shaft receiving on that end near which the circumferential slot exists a crank 49 to afford means for turning the shaft. The shaft 45 is adapted for turning movement in its bearings in the lateral projections 44 and it is also adapted for longitudinal movement in these bearings so that its pinion 46 or its crank 47 may be made the operating medium of the piston rod. A pawl 50 is pivotally mounted on the U-shaped member 42 adjacent one of the lateral projections 44, and, when the pinion 46 engages the teeth 39 of the rack portion of the piston rod, this pawl is adapted to fall in the circumferential slot 48, thus preventing longitudinal movement of the shaft and keeping the pinion 46 in engagement with the teeth 39.

Adjacent the crank 47, the shaft 45 carries a link 51 which may be slid from the straight portion of the shaft onto the crank and vice versa. When it is desired to use the crank member of the shaft, the pawl 50 is raised out of engagement with the slot 48 and the shaft is moved longitudinally in such a direction that the crank 47 will move toward the rack portion of the piston rod. The link 51 may then be slid onto the crank 47 and its free end pivotally connected with the laterally projecting stud 52 which is positioned on the portion 40 of the piston rod, which pivotal connection may be secured by a cotter pin or other suitable device passed transversely through the stud 52 after the link 51 has been attached thereon. It will be observed that the operation of moving the shaft 45 to effect the connection of the link with the piston rod serves to shift the gear 46 out of engagement with the teeth 39. Thus either the gear 46 or the crank 47 may be used as the instrument for moving the piston rod.

On the edge opposite the teeth 39 and near its bottom end, the T-shaped portion of the piston rod has a projection 53 formed thereon which is adapted to abut the underface of the transverse portion 43 of the U-shaped member when the piston rod is raised to its highest point. This projection acts as a limiting stop to prevent the upper face of the piston 16 coming in contact with the inner face of the cylinder head 18 when the piston is raised.

At the upper end of the T-shaped portion of the piston rod a second stop 54 is attached on the same edge as the stop 53 and acts in conjunction with appliances about to be described to limit the downward movement of the piston. These appliances comprise a plate 55 through which there is passed so that it will stand vertically, a second plate 56, this latter having a series of steps 57 arranged one above the other and offset with respect to each other. The transverse portion 43 of the U-shaped member 42 has a longitudinal slot 58 formed in it at a point just back of and to one side of the center of the T slot in which the T-shaped rack portion of the piston rod moves. This slot 58 is of much greater length than the width of the upstanding plate member 56 and there is a projection 59 on the upper face of the transverse portion 43 on one of the longitudinal edges of the slot. The upstanding plate member 56 beside extending above the plate 55 also extends below the latter enough to permit it to pass through the slot 58 and to receive on its bottom end a plate 61. The under face of the plate 55 is provided with a series of notches 60, any one of which may be made to engage the projection 59 as the plate 61 is moved longitudinally. The engagement between any one notch and the projection 59 is made secure by friction springs 62 which are riveted on the under face of the transverse portion 43 and positioned one on each side of the slot 58, these springs being attached to the under face of the portion 43 by having rivets suitably passed through their ends in such a manner that the springs are bowed at the center and have their bellies upon the upper face of the plate 61 on either side of the plate 56. The plates 55, 56 and 61 are so assembled that they become practically a solid member which is adapted for movement in the slot 58, and the springs 62 operate to hold this member in any position to which it is moved by pressing upon the plate 61 so that the particular notch 60 may be held in engagement with the projection 59. The object of moving the plate in the slot is for the purpose of bringing any desired step of the steps 57 in a position where it will be contacted with by the stop 54 of the T-shaped rack portion of the piston rod.

Adjacent the point where the sleeve member 38 passes through the plate 3 there is a stud 63 rotatably mounted in the plate, this stud carrying on its end above the plate, a handle 64 and on its end below the plate a dog 65, the latter being designed for engagement in a notch or slot 66 formed in the sleeve member. The dog and its coöperating notch in the sleeve member are for the purpose of rendering the spring 41 inert when it is so desired. When the sleeve member reaches the limit of its downward movement which, of course, is the limit of the downward movement of the piston rod 17, the handle 64 may be turned so as to bring the dog 65 into engagement with the notch 66, thus holding the sleeve member 38 at its lowest point and, through it, holding the spring 41 compressed. The piston rod 17 may then be reciprocated without being subjected to the pressure of the spring 41.

The three-way valve 26 comprises a body T-shaped in plan as shown in Figs. 10 and 11 and in this body a plug 68 is mounted for angular movement, the plug having a port 69 passing diametrically through it and a second port 70 ninety degrees from the first port but entering the latter at the center of the plug. The body is provided with a pin 71 and the plug 68 exterior to the body has an arcuate recess 72 cut in it ninety degrees in length and at either end of which the pin 71 is adapted to abut, thus limiting the plug to a ninety degree movement. Therefore the valve 26 may be made to effect communication between the pipe 24 and the check valve 27 or between the elbow 28 and the check valve 27, depending on which end of the recess 72 the pin abuts. When the plug 68 is turned to the position where the pin 71 stands midway between the two ends of the arcuate recess 72, none of the ports in the plug register with any of the legs of the body and communication of both the pipe 24 and the elbow 28 with the valve 27 is then cut off. While this closure position is possible, it is rarely, if ever, necessary in the practical use of the device.

The plug 68 has attached to it at the upper end, a rod 73 which passes through the plate 3 receiving on its end a handle 74 by means of which the rod and the plug 68 may be turned from the outside of the tank to either of the two positions of the plug.

The plate 3 is provided with an opening 75 through which the free end of the gooseneck 12 may be inserted, so that oil or other liquids moved by the pump may be admitted into the interior of the tank 1.

To provide means for recording the amount of liquid taken in by the pump at each upward stroke, there is a register positioned on top of the plate 3. This register comprises a casing 76 carried by a suitable standard 77, the casing 76 having a suitable dial formed on its face over which a hand 78 moves, the latter being mounted on the shaft 79 that is journaled in the center of the casing and connects with the toothed disk 80 carried within the casing. A cover plate 81 closes the casing on the back and is threadingly engaged with the latter. A block 82 is mounted within the casing and this block has pivotally connected to it one end of a lever 83 which extends transversely across the back face of the toothed disk 80, the lever having an offset portion 84. At the top of the casing 76 but interior thereto there is carried a spring actuated pawl 85 which engages the teeth of the disk. The free end of the lever 83 also carries a spring actuated pawl 86 which engages the teeth of the disk. A link 88 is pivotally connected to the lever 83 at the center of the offset portion 84 and this link passes down through an opening 87 formed centrally through the standard 77 and through the plate 3. A post 88ª is attached to the bottom of the plate 3 adjacent the point where the link 88 passes through the latter and at the bottom of this post a lever 89 is fulcrumed, the shorter arm of the lever connecting at its end with the end of the link 88. The longer arm of the lever 89 is provided with a longitudinal slot 90 through which a pin 91 passes to effect the attachment of the lever to the sleeve 38, the pin being fixed in the sleeve.

It will be observed that as the piston rod 17 is reciprocated and with it the sleeve 38, the lever 89 is rocked and causes the lever 83 to be also rocked, the upward movement of the lever 83 serving to rotate the disk 89 and with it the hand 78 while the downward movement of the lever results in its pawl 86 ratcheting over the teeth of the disk, the pawl 85 preventing backward movement of the disk when the lever 83 moves downward.

The cover plate 81 is provided with a hole 92 at its center and the disk 80 is provided with a depression 93 square in cross section, so that a suitable key may be inserted through the hole 92 and engage the depression 93 to rotate the disk 80 to bring the hand 78 to zero when it is so desired. The purpose of the offset portion 34 is to provide a clearance space for the use of such a key.

To inclose the hand 78 and the dial, a ring 94 is provided which threads onto the casing 76 and supports an appropriate glass 95 through which the dial and the hand may be observed.

Operation: In operation, the pump is capable of being used as a means for transferring oil or other liquids from one tank to another of two tanks foreign to the one in which the pump is contained. When used in this manner, the tank containing the oil to be removed therefrom has inserted into it a hose or other flexible tubing (preferably containing a check valve). The free end of this flexible tubing is then connected to the end of the elbow 7. The goose-neck 12 is then raised and turned so that its free end will project into the tank into which the oil is to be transferred. Next the pump is converted into a double acting pump by lifting the pawl 50 and shifting the shaft 45 longitudinally in its bearing thus moving the pinion 46 out of engagement with the teeth 39. The link 51 then, as before described, is shifted up onto the crank 47 and its free end is connected with the stud 52. The turning of the crank 49 turns the shaft 45 and with it the crank 47 whose first downward stroke moves the piston rod 17 downward and with it the sleeve member 38. After the piston rod 17 has reached its lowest position, the sleeve member 38 is in a position to have its notch 66 engaged by the dog 65 which engagement is effected by turning the handle 64. The sleeve member then renders the spring 41 inoperative. The handle 74 is then turned to bring the plug 68 of the three-way valve 26 into a position where communication is had between the pipe 24 and the check valve 27. The pump is then ready for performing the transferring operation of the oil or other liquid from the one tank to the other. Its first downward stroke creates a suction in the pipe 5 and through the check valve 21, this suction bringing oil in on top of the piston 16. On the upward stroke, the check valve 21 is closed but the suction is maintained in the pipe 5 through the pipe 24, the three-way valve 26 and the check valve 27, oil flowing in through the bottom end of the cylinder. But the upward stroke serves to remove the oil that was taken in on the downward stroke, the piston forcing the oil through the check valve 32, the T 30 and the pipe 6 to the goose-neck 12 from which the said oil is delivered to the receiving tank. The next downward stroke of the piston 16 ejects the oil from the bottom of the cylinder that was taken thereinto on the previous upward stroke, this oil passing through the T 29, the check valve 34, the pipe 33 to the pipe 6 and thence into the goose-neck 12, as did the oil ejected from the upper end of the cylinder. In this way the pump is capable of use as a means for transferring oil from one tank to another.

When it is desired to fill the tank 1, the pump is retained in condition to be double acting but the goose-neck 12 is turned and its free end inserted through the hole 75 in the plate 3. The oil then taken in by the pump from an outside source is transferred to the interior of the tank 1 through the goose-neck 12. The tank 1 having been supplied with oil, the pump is then operated to remove the oil from the tank in such quantities as desired, recording each quantity removed.

After having supplied the tank 1 with oil, the shaft 45 is shifted in its bearings after the link 51 has been disengaged from the stud 52, the link then being slid off the crank 47 to the straight part of the shaft. This shifting of the shaft 45 operates to bring the pinion 46 into engagement with the teeth 39 of the T-shaped rack portion of the piston rod and, when the pawl 50 drops in the circumferential slot 48, the shaft is retained in such a position to keep the pinion and the rack portion of the piston rod in engagement. The sleeve member 38 is then released from the dog 65 and it is raised by the spring 41 until the slot 40ª on its upper end engages the portion 40 of the piston rod 17. The handle 74 is then turned, causing the rod 73 to be turned and with the latter the plug 68 of the three-way valve 26, this operation bringing the port 69 of the three-way valve in registration with the elbow 28 and the port 70 in registration with that portion of the body of the valve which communicates with the check valve 27.

After the filling of the tank 1, the hose or flexible tubing which was connected with the elbow 7, of course, is removed.

After the several changes referred to have been effected, the pump is ready to remove the contained oil from the tank 1 in prescribed quantities, which quantities are determined by the adjustment of the upstanding plate 56 so as to bring one of its several steps 57 to a position where the said step will be brought into contact with the stop 54 at the top of the T-shaped rack portion of the piston rod. The plate 56 is so proportioned that its steps may regulate the length of the stroke of the piston to cause the latter to draw in one, two or three quarts. For example: If the plate 56 is so positioned that its top step will contact with the stop 54, the length of the stroke of the piston rod together with the cross sectional area of the pump cylinder is such that one quart will be drawn in by the pump when the piston moves a distance equal to the distance which the stop 54 travels when moving from the upper edge of the topmost step 57 to the end of the upward stroke of the piston, which occurs when the projection 53 abuts the under face of the transverse portion 47 of the U-shaped member 42. If the intermediate step 57 is employed for the point 54 to abut, the length of the stroke of the piston is doubled and the quantity of oil drawn in through the bottom of the pump is also doubled. If the third step 57 is employed, the length of the piston stroke is tripled and the quantity of oil taken in by the pump is also tripled.

The plate 56 having been adjusted to remove the desired quantity of oil with each stroke, the piston 17 is moved downward by means of the crank 49 which, turning the shaft 45, turns the pinion 46 causing it to move the T-shaped rack portion and with it the piston rod downward against the pressure of the spring 41. After the piston has reached the end of its downward stroke, as prescribed by the particular step 57 of the plate 56 which is employed, the crank 49 is released and the spring 41 then operates to raise the piston, thereby creating a suction in the bottom end of the cylinder 15 and causing the oil to be drawn thereinto through the elbow 28 and the check valve 27. On the succeeding downward stroke, this oil is ejected through the check valve 34, the pipe 6 and the goose-neck 12 as in the other operation, the goose-neck transferring the oil to any desired receptacle.

The free end of the elbow 28 is designed to lie as close to the bottom of tank 1 as practical, so that all the oil contained in the tank may be removed therefrom.

Each stroke of the piston rod 17 with the spring 41 and sleeve 38 operatively engaged causes the lever 89 to be rocked and to transmit its rocking movement to the lever 83 whose spring actuated pawl 86, engaging the toothed periphery of the disk 80, rotates the latter through a specified angular movement dependent upon the length of the stroke as prescribed by the plate 56. The shorter stroke of the piston rod 17 is intended to move the disk 80 through an arc that will cause the hand 78 to be moved across one unit of the dial, these units being in quarts or in the same units that the steps 57 are designed to represent. If the length of the stroke of the piston rod is double that of a previous stroke, the angular movement of the disk 80 will be twice the angular movement that occurred with the previous stroke. Thus the quantity of oil removed from the tank 1 is recorded from which record the quantity of oil remaining in the tank may be calculated.

The invention having been described, what is claimed as new and useful is:

1. In a device of the kind set forth, a tank, a cover plate therefor, a pump, inlet and outlet pipes attached to and passing through the cover plate, said pipes supporting the pump and connecting with each end thereof, check valves in said pipes at each end of the pump, a three-way valve in the inlet pipe, an inlet elbow connected with the three-way valve adjacent the bottom of the tank, a handle on top of the cover plate, and a rod connecting the handle with the three-way valve whereby the pump may be rendered double acting to fill the tank and single acting to empty the same.

2. In a device of the kind set forth, a tank, a cover plate therefor, a pump, inlet and outlet pipes attached to and passing through the cover plate, said pipes supporting the pump and connecting with each end thereof, check valves in said pipes at each end of the pump, a three-way valve in the inlet pipe, an inlet elbow connecting with the three-way valve adjacent the bottom of the tank, means carried by the cover plate and connecting with the three-way valve whereby the latter may be operated, and devices for regulating the stroke of the pump whereby the latter may supply the tank with a liquid and then remove the said liquid therefrom in prescribed quantities.

3. In a device of the kind set forth, a tank, a cover plate therefor, a pump, inlet and outlet pipes attached to and passing through the cover plate, said pipes supporting the pump and connecting with each end thereof, check valves in said pipes at each end of the pump, a three-way valve in the inlet pipe, an inlet elbow connecting with the three-way valve adjacent the bottom of the tank, means for operating the three-way valve, a register, connections between the pump and the register, and a device for adjusting the length of the stroke of the pump, whereby the pump may be regulated to take in a liquid in various prescribed quantities which are recorded on the register through the instrumentality of the connections conjoined therewith.

4. In a device of the kind set forth, a tank, a cover plate therefor, a pump, inlet and outlet pipes attached to and passing through the cover plate, said pipes supporting the pump and connecting with each end thereof, check valves in said pipes at each end of the pump, a three-way valve in the inlet pipe, an inlet elbow connecting with the three-way valve adjacent the bottom of the tank, means for operating the three-way valve, and a member conjoined with the inlet pipe whereby the pump may be employed to fill the tank or to transfer a liquid from one to the other of two foreign tanks.

5. In a device of the kind set forth, a tank, a cover plate therefor, a pump, a piston and piston rod therefor, the piston rod passing through the cover plate, inlet and outlet pipes attached to and passing through the cover plate, said pipes supporting the pump and connecting with each end thereof, check valves in said pipes at each end of the pump, a three-way valve in the inlet pipe, an inlet elbow connecting with the three-way valve, means for operating the three-way valve, means for imparting a forward stroke to the piston, and resilient means for effecting the return stroke of the same.

6. In a device of the kind set forth, a tank, a cover plate therefor, a pump, a piston and piston rod therefor, the piston rod extending through the cover plate, a rack portion formed at the upper end of the piston rod, inlet and outlet pipes attached to and passing through the cover plate, said pipes supporting the pump and connecting with each end thereof, check valves in said pipes at each end of the pump, a three-way valve in the inlet pipe, an inlet elbow connecting with the three-way valve, a rotatable shaft mounted on top of the cover plate, a pinion carried by said shaft and meshing with said rack, means for turning the shaft, a sleeve member in surrounding relation to the piston rod and passing slidably through the cover plate, and a spiral spring also in surrounding relation to the piston rod and pressing upon the sleeve member.

7. In a device of the kind set forth, a tank, a cover plate therefor, a pump, a piston and piston rod therefor, the piston rod passing through the cover plate, a rack formed at the upper end of the piston rod, inlet and outlet pipes attached to and passing through the cover plate, said pipes connecting with each end of the pump, check valves in said pipes and communicating with each end of the pump, a three-way valve in the inlet pipe, an inlet elbow connecting with the three-way valve, a shaft journaled on top of the cover plate and having means to provide for its being turned, the shaft having a crank formed therein, a pinion carried by the shaft, a resilient member conjoined with the piston rod, and means whereby the pinion or the crank may be employed as the operating mechanism for the piston rod.

8. In a device of the kind set forth, a tank, a cover plate therefor, a pump, inlet and outlet pipes attached to and passing through the cover plate, said pipes supporting the pump and connecting with each end thereof, check valves in said pipes at each end of the pump, a three-way valve in the inlet pipe, an inlet elbow connecting with the three-way valve, and a goose-neck telescopically connected with the outlet pipe, the cover plate having an opening with which the goose-neck may register, whereby the pump may be employed to fill the tank or to remove oil therefrom.

9. In a device of the kind set forth, a tank, a cover plate therefor, a pump, inlet and outlet pipes attached to and passing through the cover plate, said pipes supporting the pump and connecting with each end thereof, check valves in said pipes at each end of the pump, a three-way valve in the inlet pipe, an inlet elbow connected with the three-way valve, and a step member adjustably connected with the cover plate whereby the stroke of the pump may be regulated.

10. In a device of the kind set forth, a tank, a cover plate therefor, a pump, a piston and piston rod for the pump, the piston rod passing through the cover plate, a rack attached to the end of the piston rod, inlet and outlet pipes attached to and passing through the cover plate, said pipes connecting with each end of the pump, check valves in said pipes at each end of the pump, a three-way valve in the inlet pipe, an inlet elbow connecting with the three-way valve, a shaft journaled on top of the cover plate and having means to provide for its turning, a pinion carried by the shaft, the former having a crank formed therein, a sleeve member in surrounding relation to the piston rod, a spring also in surrounding relation to the piston rod and bearing upon the sleeve member, means whereby the pinion or the crank may be used as the operating mechanism of the piston rod, and means for locking the sleeve members in inactive position.

11. In a device of the kind set forth, a tank, a pump within said tank, inlet and outlet pipes attached to the pump and passing through the upper end of the tank, check valves in said pipes, a piston rod for the pump, a register, connections between the piston rod and the register, and means whereby the stroke of the pump may be regulated, so that the register may record in quantity units the volume taken in by each stroke of the pump.

In testimony whereof I affix my signature.

ABRAHAM L. KIRKWOOD.

Copies of this patent may be obtained for five cents each, by addressing the "Commissioner of Patents, Washington, D. C."